(12) United States Patent
Henderson et al.

(10) Patent No.:  US 12,627,199 B2
(45) Date of Patent:       May 12, 2026

(54) ROTOR BALANCE RING AND OIL FLINGER

(71) Applicant: BorgWarner Inc., Auburn Hills, MI (US)

(72) Inventors: Kurtis Erron Henderson, Candler, NC (US); Michael Sean Ward, Etowah, NC (US)

(73) Assignee: BorgWarner Inc., Auburn Hills, MI (US)

( * ) Notice:   Subject to any disclaimer, the term of this patent is extended or adjusted under 35 U.S.C. 154(b) by 561 days.

(21) Appl. No.: 16/694,658

(22) Filed:    Nov. 25, 2019

(65)          Prior Publication Data

US 2021/0159760 A1     May 27, 2021

(51) Int. Cl.
| | |
|---|---|
| *H02K 7/04* | (2006.01) |
| *F02B 39/10* | (2006.01) |
| *F16N 31/02* | (2006.01) |
| *H02K 1/28* | (2006.01) |

(52) U.S. Cl.
CPC .............. *H02K 7/04* (2013.01); *F02B 39/10* (2013.01); *F16N 31/02* (2013.01); *H02K 1/28* (2013.01); *F16N 2210/18* (2013.01)

(58) Field of Classification Search
CPC .............. H02K 7/04; H02K 1/28; H02K 7/14; F16N 31/02; F16N 2210/18; F02B 39/10
USPC ........................................ 310/40 R, 216.117
See application file for complete search history.

(56)              References Cited

U.S. PATENT DOCUMENTS

| | | | |
|---|---|---|---|
| 4,243,357 A | 1/1981 | Flynn et al. | |
| 4,976,147 A | 12/1990 | Okochi et al. | |
| 6,364,634 B1 | 4/2002 | Svihla et al. | |
| 6,896,479 B2 | 5/2005 | Svihla et al. | |
| 8,294,319 B2 | 10/2012 | Shibui et al. | |
| 9,080,503 B2 | 7/2015 | Buschur et al. | |
| 9,097,606 B2 | 8/2015 | Kataoka et al. | |
| 9,182,311 B2 | 11/2015 | Clark et al. | |
| 9,250,150 B1 | 2/2016 | Park et al. | |
| 10,077,661 B2 | 9/2018 | Maeda | |
| 10,082,070 B2 | 9/2018 | Buschur et al. | |
| 10,119,401 B2 | 11/2018 | Maeda et al. | |
| 10,119,701 B2 | 11/2018 | Chase | |
| 2010/0019602 A1* | 1/2010 | Saban .................... | H02K 1/165 |
| | | | 310/156.28 |
| 2010/0175377 A1* | 7/2010 | Hippen .................... | F02C 6/12 |
| | | | 60/602 |
| 2011/0273040 A1* | 11/2011 | Chamberlin ............. | H02K 1/32 |
| | | | 310/59 |
| 2014/0028146 A1* | 1/2014 | Sugimoto .............. | H02K 1/265 |
| | | | 310/216.069 |
| 2014/0042841 A1* | 2/2014 | Rippel .................... | H02K 1/32 |
| | | | 310/54 |
| 2014/0062245 A1* | 3/2014 | Taniguchi ................ | H02K 1/27 |
| | | | 310/156.28 |
| 2014/0203681 A1* | 7/2014 | Xiang .................... | H02K 1/165 |
| | | | 310/216.001 |
| 2014/0375166 A1* | 12/2014 | Barton ................. | H02K 17/165 |
| | | | 29/598 |

(Continued)

*Primary Examiner* — Terrance L Kenerly
(74) *Attorney, Agent, or Firm* — von Briesen & Roper, s.c.

(57)              ABSTRACT

A turbocharger includes a rotor rotatably mounted within the turbocharger about a rotor axis, a balance ring provided at an axial end of the rotor, and a cutout provided in the balance ring, the cutout having an open end extending radially outward from the rotor axis.

16 Claims, 4 Drawing Sheets

(56)  References Cited

U.S. PATENT DOCUMENTS

| | | | |
|---|---|---|---|
| 2015/0139830 A1* | 5/2015 | Nigo ..................... | H02K 29/03 |
| | | | 310/216.097 |
| 2015/0333584 A1* | 11/2015 | McMullen ............ | H02K 1/278 |
| | | | 310/156.28 |
| 2016/0141930 A1* | 5/2016 | Kanazawa .............. | H02K 1/28 |
| | | | 310/156.01 |
| 2018/0163617 A1* | 6/2018 | Merritt ................. | F01D 11/005 |
| 2018/0163739 A1* | 6/2018 | Tabacchi .................. | F01D 5/02 |
| 2020/0149553 A1* | 5/2020 | Roberts .................. | F01D 5/027 |
| 2021/0159760 A1* | 5/2021 | Henderson ............ | F02B 39/10 |

* cited by examiner

ROTOR BALANCE RING AND OIL FLINGER

TECHNICAL FIELD

The present disclosure relates to balancing of turbo-charger rotors.

BACKGROUND

Current methods of component balancing of magnetic rotors are accomplished by drilling or milling into an endcap of the rotor. Such drilling results in cavities that are prone to collect debris, ferrous or otherwise. The buildup of debris in the cavities may unbalance the rotating assembly above design limits and lead to a shortened lifespan of the rotor assembly or require more frequent preventative maintenance to remove the built up debris.

Further, magnetic rotors are mounted on shafts lubricated by oil. There is a potential for oil to seep along the shaft into an airgap between a rotor and a stator. Oil seeping into the airgap may increase windage losses of the turbocharger and result in degraded performance.

U.S. Pat. No. 8,294,319 by Shibui, et. al., discloses a rotor constituted by a motor shaft, a permanent magnet surrounding the motor shaft around the axis, a pair of end rings surrounding the motor shaft around the axis and pinching the permanent magnet, and a hollow cylindrical outer sleeve surrounding the permanent magnet and the pair of end rings in a fastening state around the axis. One end portion or both end portions of the outer sleeve protrudes in the axial direction than an end surface of the end ring. A rotating balance correction is executed by pruning away a part of the protruding portion.

However, such a rotor disclosed by the '319 patent may still be improved. Thus, a rotor balance ring with an oil flinger is desired.

SUMMARY

In one described embodiment of the disclosure, turbo-charger includes a rotor rotatably mounted within the turbocharger about a rotor axis, a balance ring provided at an axial end of the rotor, and a cutout provided in the balance ring, the cutout having an open end extending radially outward from the rotor axis.

In another described embodiment of the disclosure, tur-bocharger includes a rotor rotatably mounted with the tur-bocharger about a rotor axis, the rotor having a first axial end and a second axial end opposite the first axial end, a first balance ring provided at the first axial end, the first balance ring including a first cutout having a first open end extending radially outward from the rotor axis, a second balance ring provided at the second axial end, the second balance ring including a second cutout having a second open end extending radially outward from the rotor axis, a stator, an airgap between the stator and the rotor; a shaft rotatable about the rotor axis, and an oil system to lubricate the shaft. The first and second balance rings are configured to be an oil flinger to direct oil from along the shaft towards the rotor and away from the air gap.

In yet another described embodiment of the disclosure, a rotor or a turbocharger includes a balance ring disposed on a first axial end of the rotor and a cutout provided on an outer circumferential surface of the balance ring. The cutout includes an open end extending radially outward from a rotor axis.

These and other aspects are disclosed in more detail in the detailed description and the accompanying figures.

BRIEF DESCRIPTION OF THE DRAWINGS

One or more embodiments of the disclosure will herein-after be described in conjunction with the appended draw-ings, wherein like designations denote like elements, and wherein.

DETAILED DESCRIPTION OF ILLUSTRATED EMBODIMENTS

Figure 1:
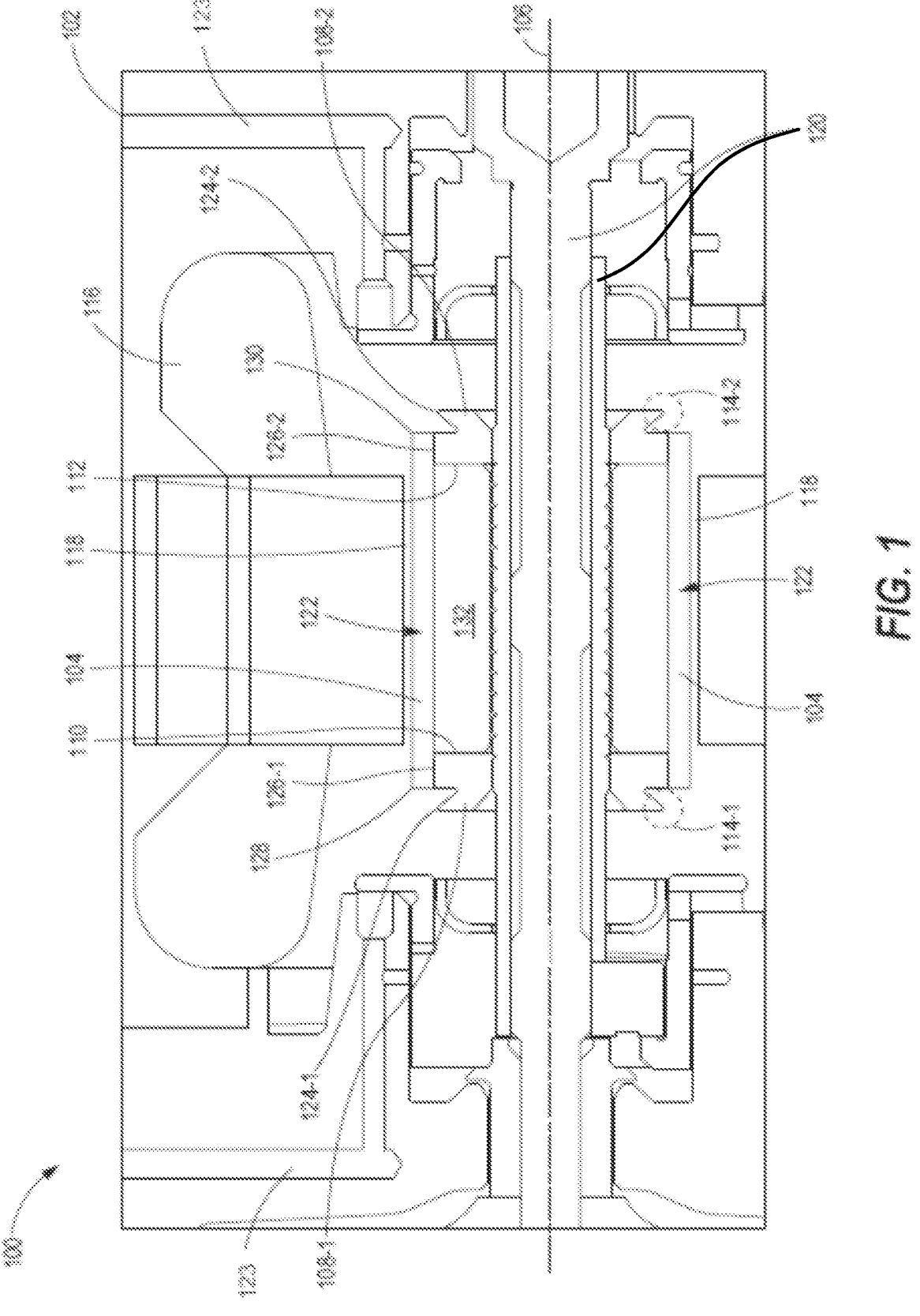
FIG. 1 depicts a cross-sectional view of a turbocharger, in accordance with an embodiment of the present disclosure.

Referring initially to FIG. 1, FIG. 1 depicts a cross-sectional view of a turbocharger, in accordance with an embodiment of the present disclosure. In particular, FIG. 1 depicts the cross-sectional view 100 that includes aspects of the turbocharger 102. The turbocharger 102 includes a rotor 104, that may be realized as a magnetic rotor with a magnetic core 132 disposed between a shell 122. The rotor 104 is rotatably mounted within the turbocharger 102 to rotate about a rotor axis 106.

The rotor 104 includes balance rings 108-1 and 108-2 disposed at the axial ends 110, 112 of the rotor. The balance rings 180-1 and 108-2 include bases 126-1 and 126-2, respectively, that are contained within the shell 122. The balance ring 108-1 includes a first flange 124-1 that extends past a first end 128 of the shell 122 and the balance ring 108-2 includes a second flange 124-2 that extends past a second end 130 of the shell 122. Although the turbocharger 102 is depicted having a rotor provided with two balance rings 108, it is understood that a rotor 104 may be provided with a single balance ring at one axial end (e.g., the balance ring 108-1 at the first end axial end 110) and a cap at the other axial end (e.g., a cap at the second axial end 112).

Either one or both of the balance rings 108-1 and 108-2 may include a cutout 114. The cutout 114 includes an open end 302 that extends radially outward from the rotor axis 106. Aspects of cutouts 114 associated with different embodiments are disclosed in more detail herein. However, as a preliminary matter, it is within the scope of the present disclosure for a rotor 104 to be provided with either one or two balance rings 108. Further, in embodiments with a balance ring 108 disposed at either axial end of the rotor 104, either one or both of the balance rings 108 may include a cutout 114.

The cutouts 114 are configured such that debris is not trapped within the cutout 114 during operations of the turbocharger 102. This is accomplished, in part, by provid-ing a cutout 114 that includes an open end that extends radially outward from the rotor axis 106. Because of the open end 302, debris is able to be ejected from the cutout due to a centrifugal force realized on any debris within the cutout 114 when the rotor 104 rotates about its rotor axis 106.

Both the size and position of the cutouts 114 is determined based at least in part on a measure of imbalance of the rotor 104 combined with the balance ring 108. The size of the cutouts 114 may be affected by the size of the tool that is introducing the cutouts 114 onto the balance rings 108, a position of the cutout 114 for a given tool size, or both. In some embodiments, the cutouts 114 may be disposed on an outer circumferential surface of the balance ring 108. Further, the cutouts 114 may be a concave cutout, which may include the cylindrical cutouts described below.

In some embodiments, the cutouts 114 are defined by an open end and a cutout wall. The open end is a portion of the balance ring that is removed to provide for the cutout. In particular, the open end may be along the outer circumferential surface of a flange of the balance ring. The cutout wall is the innermost portion of the cutout of the balance ring 108, representing where the tool that provided the cutout 114 stopped removing material from the balance ring 108. In some embodiments, an entire cutout wall is exposed to the open end.

The turbocharger 102 may further include a shaft 120 that is configured to rotate about the rotor axis 106, an oil system 123 to lubricate the shaft 120, a stator 116, and an airgap between the rotor 104 and the stator 116.

The rotor 104 is configured to rotate, with the shaft 120, about the rotor axis 106. The rotating components of the turbocharger 102 (e.g., the balance rings 108, the magnetic core 132, and the shell 122 of the rotor 104) may be balanced by way of providing cutouts 114 on the balance rings 108. In some embodiments, the balance rings 108 are configured to be an oil flinger that directs oil from the oil system 123 from along the shaft 120 towards the stator 116 and away from the airgap 118.

Figure 3:
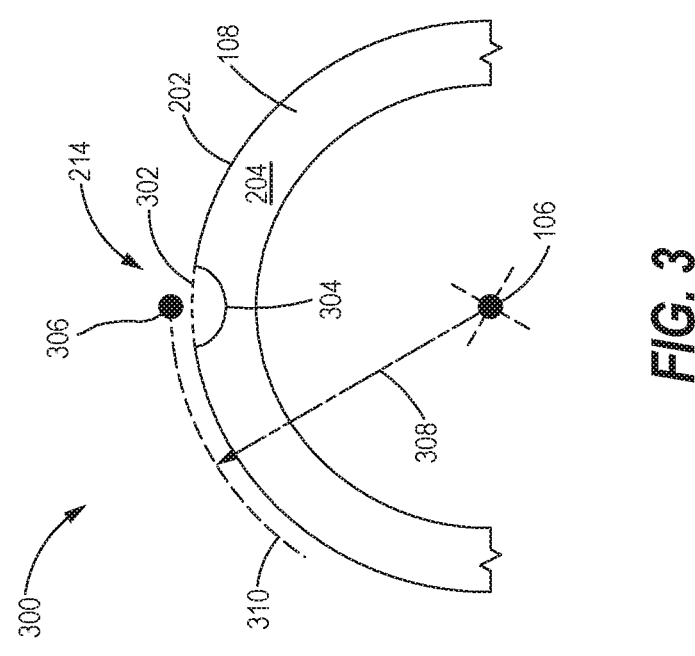
FIG. 3 depicts a top view of the first balance ring having a first cylindrical cutout, in accordance with an embodiment of the present disclosure.
Figure 2:
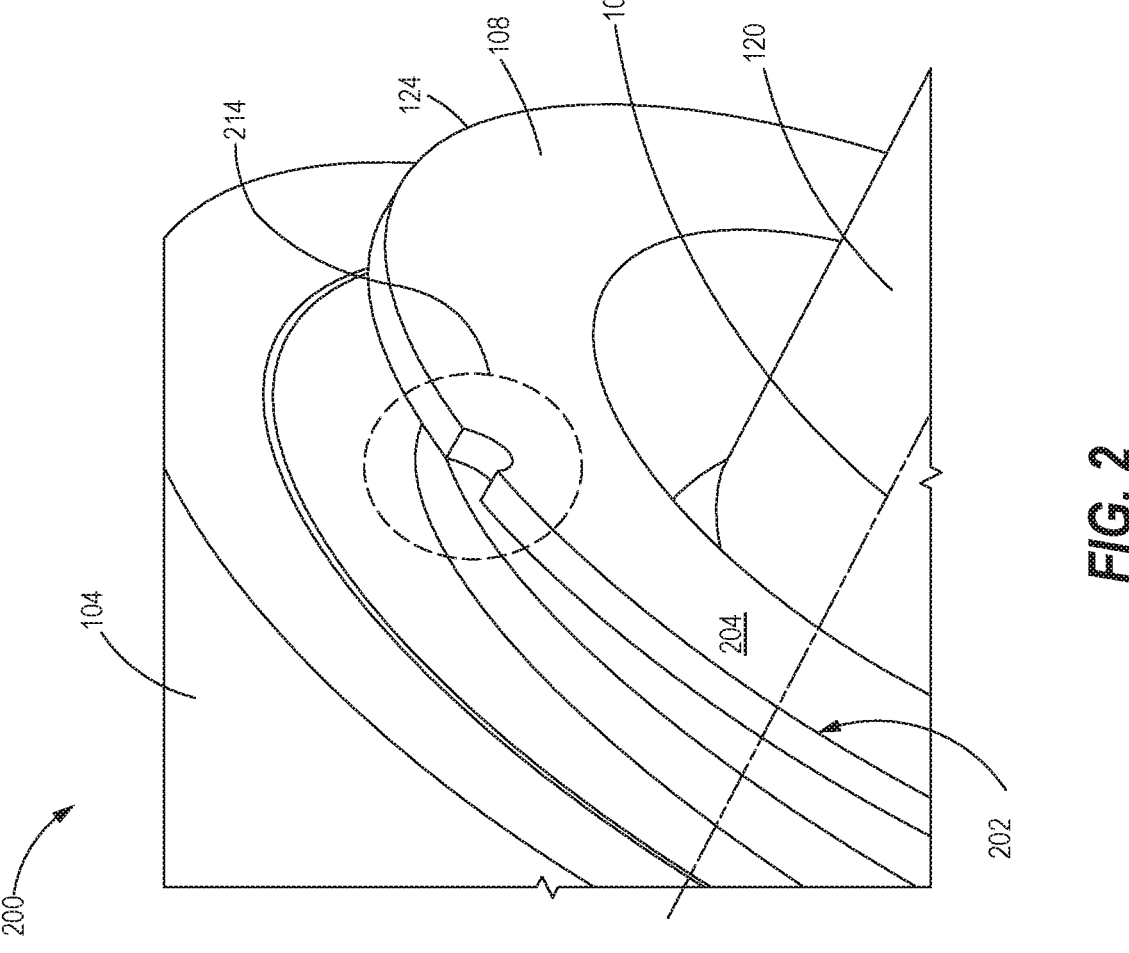
FIG. 2 depicts a perspective view of a first balance ring having a first cutout, in accordance with an embodiment of the present disclosure.

FIG. 2 depicts a perspective view and FIG. 3 depicts a top view of a first balance ring having a first cutout, in accordance with an embodiment of the present disclosure. In particular, FIG. 2 depicts the perspective view 200 and FIG. 3 depicts the top view 300, each being of the balance ring 108 having a first cutout 214. The first cutout 214 is an exemplary cutout that may be included as the cutout 114 on either one or both of the balance rings 108-1, 108-2 of the turbocharger 102 of FIG. 1.

The first cutout 214 is disposed on an outer circumferential surface 202 of the balance ring 108. Here, the first cutout 214 is disposed on the flange 124 of the balance ring 108. The first cutout 214 is a cylindrical cutout having a cutout axis 306. The cylindrical axis 306 is parallel to the rotor axis 106. The first cutout 214 is provided in the balance ring 108 by way of cutting, drilling, or milling into the balance ring 108.

The first cutout 214 is defined by an open end 302 and a cutout wall 304. The open end 302 is realized by the surface of the outer circumferential surface 202 that was removed to form the first cutout 214. The cutout wall 304 is realized by the material remaining in the balance ring 108 that was not removed by the tool providing for the first cutout 214. In some embodiments, the entire cutout wall 304 is exposed to the open end 302. In such an embodiment, an imaginary line extending from the rotor axis 106, through the cutout wall 304 would continue to extend through the open end 302.

As depicted in FIGS. 2 and 3, the first cutout 214 may be provided by drilling in an axially direction (e.g., along the cutout axis 306) or by milling into outer circumferential surface 202 in a radial direction towards the rotor axis 106. The cutout axis 306 represents a location of a center of a tool that provided the first cutout 214. As shown in the top view 300, the arc 310 extends from the cutout axis 306 at a radial measurement 308.

The radial measurement 308 represents a distance between the rotor axis 106 and the cutout axis 306. When the first cutout 214 is provided by a circular tool, the cutout axis 306 is located at a radial measurement 308 that exceeds a radial measurement from the rotor axis 106 to the outer circumferential surface 202. For a given circular tool, if the cutout axis 306 were located at a radial measurement 308 that was less than a radial measurement from the rotor axis 106 to the outer circumferential surface 202, the portions of the cutout wall 304 that are located at radial measurements greater than the cutout axis would not be exposed to the open end 302.

Figure 5:
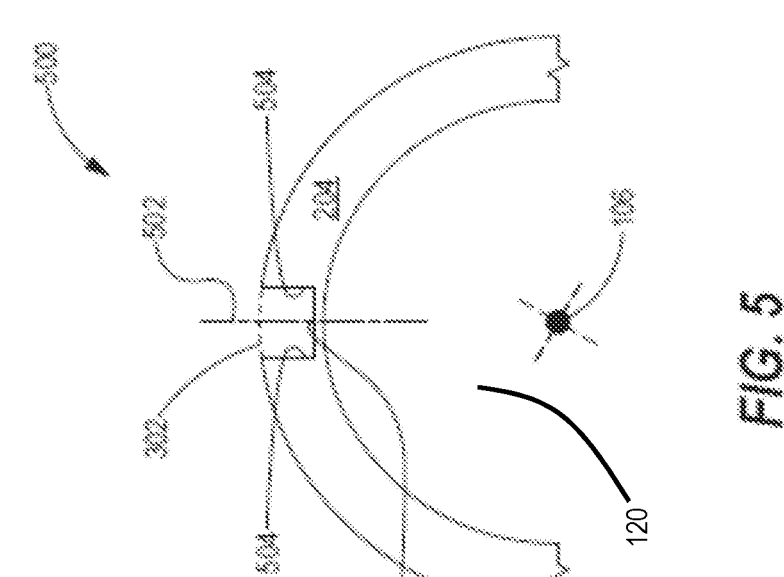
FIG. 5 depicts a top view of the second balance ring having a second cylindrical cutout, in accordance with an embodiment of the present disclosure.
Figure 4:
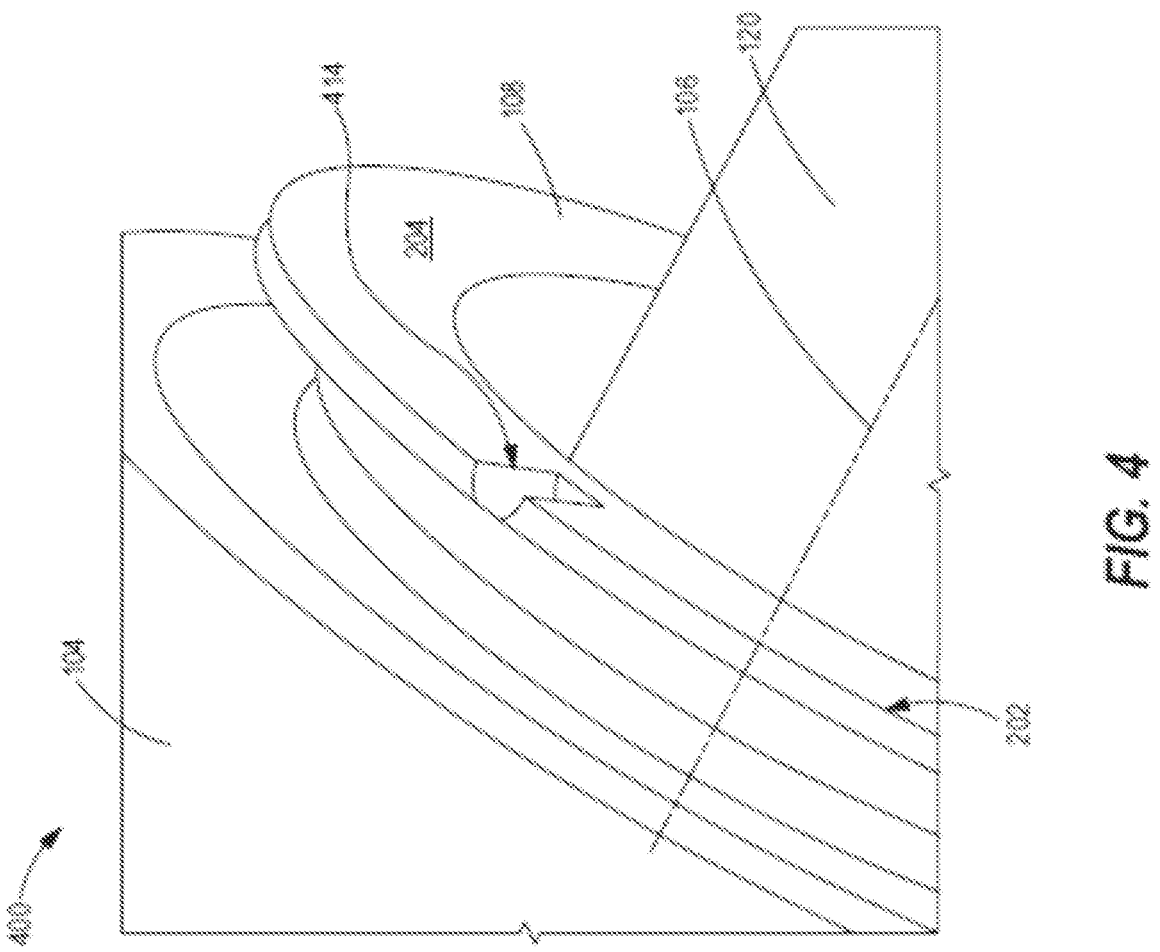
FIG. 4 depicts a perspective view of a second balance ring and a rotor, in accordance with an embodiment of the present disclosure.

FIG. 4 depicts a perspective view and FIG. 5 depicts a top view of a second balance ring having a second cutout, in accordance with an embodiment of the present disclosure. In particular, FIG. 4 depicts the perspective view 400 and FIG. 5 depicts the top view 500, each being of a balance ring 108 having the second cutout 414. FIGS. 4 and 5 are similar to that of FIGS. 2 and 3, but disclose the second cutout 414 that is a cylindrical cutout having a cutout axis 502 that is transverse to the rotor axis 106.

The second cutout 414 includes the open end 302 and the cutout wall 304. However, since the second cutout 414 has a cutout axis 502 that is transverse to the rotor axis 106 (as compared to the cutout axis 306 that is parallel to the rotor axis 106) the cutout wall 304 of the second cutout 414 includes the cylindrical wall 504 and the back wall 506. The cylindrical wall 504 generally extends radially outward from the rotor axis 106. The second cutout 414 may be formed into the balance ring by drilling radially into the balance ring 108. In the second cutout 414, the cylindrical wall 504 and the back wall 506 are both exposed to the open end 302.

The diameter of the first cylindrical cutout 214 and the second cylindrical cutout 414 may be based on a measure of imbalance of the rotor 104 combined with the balance ring 108. Thus, for a greater measure of imbalance, the diameter of the cutout may be increased to remove additional mass from the balance ring 108 to correct for the imbalance. Inversely, for a smaller measure of imbalance, the diameter of the cutout may be decreased to remove less mass from the balance ring 108 to correct for the imbalance.

Additionally, the position of the cutout axis may be based at least in part on the measure of imbalance of the rotor 104 combined with the balance ring 108. For example, in the first cylindrical cutout 214 of FIGS. 2 and 3, the radial measurement 308 between the cutout axis 306 and the rotor axis 106 may be increased to produce a shallower cut to produce the first cylindrical cutout 214. This results in less mass being removed from the balance ring 108. Alternatively, the radial measurement 308 may be decreased to produce a deeper cut to produce the first cylindrical cutout 214. This results in more mass being removed from the balance ring 108. If not, decreasing the radial measurement 308 to be less than the outer radius measurement associated with the outer circumference 202 may result in portions of the cutout wall 304 not being exposed to the open end 302. This may be the case when the first cylindrical cutout 214 is drilled via a drill bit being inserted along the first cutout axis 306, rather than a tool being inserted radially inward towards the rotor axis 106.

In the case of the second cylindrical cutout 414 of FIGS. 4 and 5, a height of the cutout axis 502 above a top surface 204 defining an axial plane of the balance ring 108 may be selected based at least in part on a measure of imbalance of the rotor 104 combined with the balance ring 108. Similar to adjusting the cutout axis 306 of the first cylindrical cutout 114, the height of the cutout axis 502 above the top surface 204 may be reduced to provide a deeper cutout to remove more mass from the balance ring 108 and it may be increased to provide a shallower cutout to remove less mass from the balance ring 108.

INDUSTRIAL APPLICABILITY

In general, the present disclosure may find applicability in many industries, for example, the automotive industry, and more particularly, turbochargers for combustion engines. However, the techniques disclosed herein may be utilized in any number of systems including rotating components that are balanced.

Figure 6:
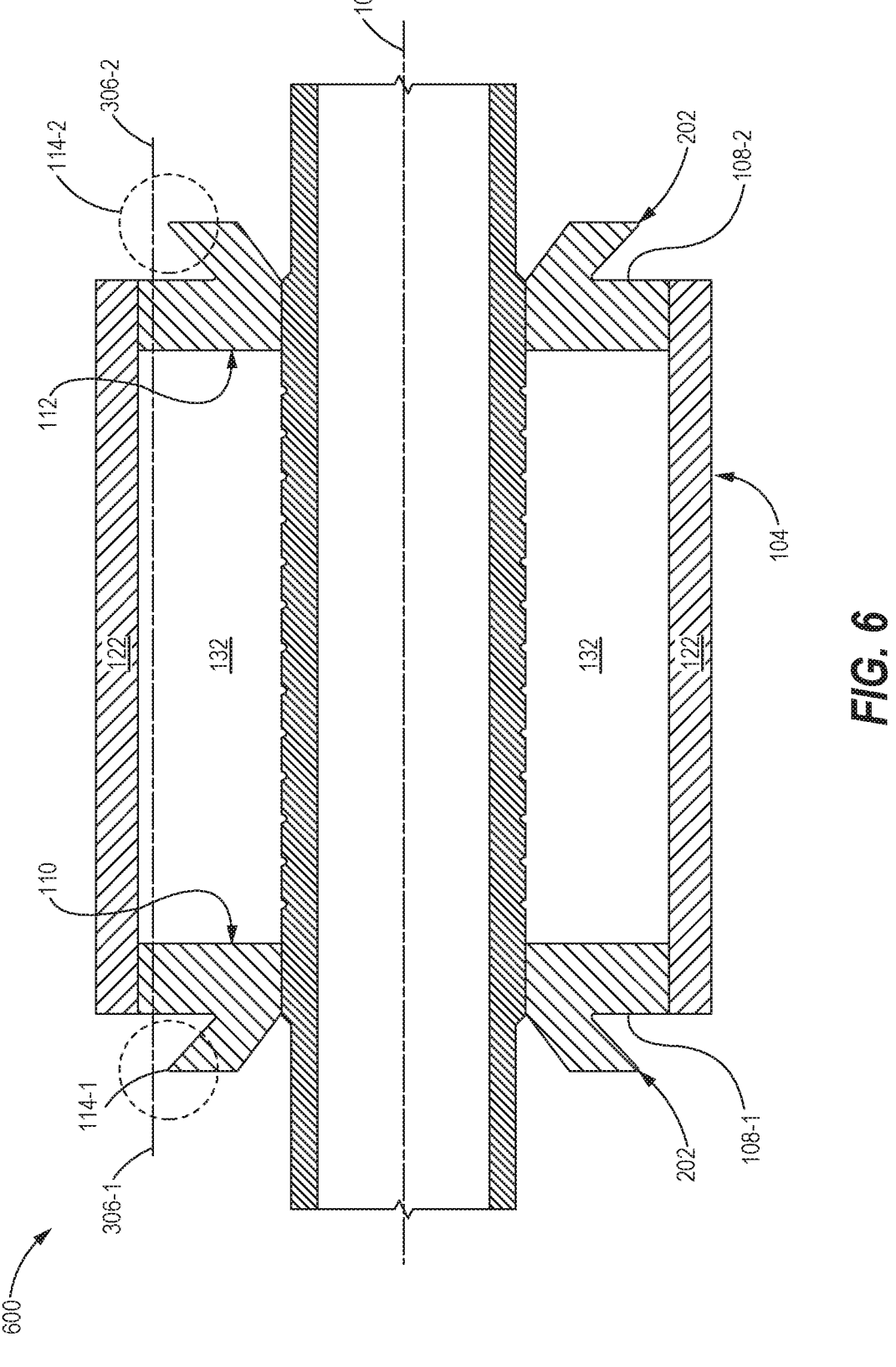
FIG. 6 depicts a cross-sectional view of a rotor and balance ring, in accordance with an embodiment of the present disclosure.

FIG. 6 depicts a cross-sectional view of a rotor and balance ring, in accordance with an embodiment of the present disclosure. In particular, FIG. 6 depicts the cross sectional view 600 of the rotor 104. The rotor 104 may be configured to be received in a turbocharger, such as the turbocharger 102 of FIG. 1, such that it rotates about the rotor axis 106.

The rotor 104 includes a first balance ring 108-1 disposed on the first axial end 110. In some embodiments, the rotor further includes a second balance ring 108-2 disposed on the second axial end 112 that is opposite the first axial end 110.

The first balance ring 108-1 includes a first cutout 114-1 on the outer circumferential surface 202 of the first balance ring 108-1. The cutout 114-1 may include an open end 302, such as the open end 302 depicted in FIG. 3, that extends radially outward from the rotor axis 106.

The second balance ring 108-2 may include a second cutout 114-2, also on its outer circumferential surface 202. Although a second cutout 114-2 may not be required if the first cutout 114-1 disposed on the first balance ring 108-1 removes sufficient mass to correct an imbalance of the rotor 104. However, it may be desirable to provide a rotor having a first cutout 114-1 on the first balance ring 108-1 and a second cutout 114-2 on the second balance ring 108-2.

The balance rings 108-1, 108-2 act as oil flingers. Thus, oil migrating along a shaft of the turbocharger towards the rotor 104 may reach the balance rings 108 and be redirected tangentially outward towards a stator of the turbocharger. In such embodiments, the combined mass removed from both the first and second cutouts 114-1, 114-2 is sufficient to correct an imbalance of the rotor 104. The size of the first and second cutouts 114-1, 114-2 may be varied by the methods disclosed herein, and include at least varying a circumference of a cylindrical cutout and positioning the cutout axis relative to the rotor axis 106 or relative to the top surface 204.

In some embodiments, either one or both of the first cutout 114-1 and the second cutout 114-2 is a concave cutout having a cutout wall 304, with the entire cutout wall 304 being exposed to the open end 302. Although depicted as cutouts 114 having a cutout axis 306 that is parallel to the rotor axis 106, it is understood that either one or both of the cutouts 114 may also be realized as a cutout 114 having a cutout axis 502 that is transverse to the rotor axis 106.

In some embodiments with both the first cutout 114-1 and the second cutout 114-2 being cylindrical cutouts having a cutout axis 306 that is parallel to the rotor axis 106 (e.g., first cutouts 214 of FIGS. 2 and 3) the cutout axis 306-1 of the first cutout 114-1 and the cutout axis 306-2 of the second cutout 114-2 coincide with each other. In other terms, both the first cutout 114-1 and the second cutout 114-2 are both positioned at a same respective point on the balance ring from a rotational perspective.

It is to be understood that the foregoing may be a description of only one embodiment of the disclosure. However, the disclosure is not limited to the particular embodiment(s) disclosed. Moreover, statements contained in the description that relate only to particular embodiments are not to be construed as limitations on scope of the disclosure, or on definitions of terms used in the claims, except where a term or phrase may have been expressly defined. Various other embodiments, changes, and modifications to the disclosed embodiment(s) will be apparent to those skilled in the art, and are intended to fall within the spirit and scope of the appended claims.

As used in this disclosure, various terms "e.g.," "for example," "for instance," "such as," and "like," and verbs "comprising," "having," "including," and their other verb forms, when used in conjunction with a listing of one or more components or other items, are to be construed as open-ended, meaning that the listing is not to be considered as excluding other or additional components or items. All terms are to be given their broadest reasonable meanings unless used in contexts that clearly require different interpretations.

What is claimed is:

1. A turbocharger comprising:
   a magnetic rotor rotatably mounted within the turbocharger about a rotor axis, the magnetic rotor having a magnetic core disposed within a shell;
   a balance ring disposed in and provided at an axial end of the magnetic rotor and having a base and a flange extending axially from the base away from the axial end of the magnetic rotor, the base being contained within the shell;
   a cylindrical shaped cutout provided in the flange of the balance ring, the cutout having an open end extending radially outward from the rotor axis and a cutout axis aligned to an axis of the magnetic rotor;
   a stator positioned radially outward from the magnetic rotor and axially aligned with the magnetic rotor;
   an airgap between an inner surface of the stator and an outer surface of the magnetic rotor; and
   a shaft rotatable about the rotor axis;
   wherein the balance ring is configured to be an oil flinger to eject oil from the cutout as the balance ring rotates, and the cutout is configured to have a diameter based on a measured imbalance of the magnetic rotor.

2. The turbocharger of claim 1, wherein the cutout is disposed on an outer circumferential surface of the balance ring and includes a cutout wall, the entire cutout wall being exposed to the open end.

3. The turbocharger of claim 1, wherein the cutout has a cutout axis that is transverse to the rotor axis and extends radially outward from the rotor axis.

4. The turbocharger of claim 3, wherein a height measurement between the cutout axis and an axial plane of a top surface of the flange is based on a measure of imbalance of the magnetic rotor combined with the balance ring.

5. The turbocharger of claim 1, wherein the cutout has a cutout axis that is parallel to the rotor axis.

6. The turbocharger of claim 5, wherein a radial measurement between the cutout axis and the rotor axis is based on a measure of imbalance of the magnetic rotor combined with the balance ring.

7. The turbocharger of claim 1, wherein the cutout is a concave cutout.

8. A turbocharger comprising:

a magnetic rotor rotatably mounted within the turbocharger about a rotor axis, the magnetic rotor having a magnetic core disposed within a shell, the magnetic rotor having a first axial end and a second axial end opposite the first axial end;

a first balance ring of the magnetic rotor forming the first axial end and having a first base and a first flange extending axially from the first base past the first axial end of the rotor, the first base being located within the shell, the first flange of the first balance ring extending away from the shell and including a first cylindrical shaped cutout having a first open end extending radially outward from the rotor axis and a first cutout axis aligned to an axis of the magnetic rotor;

a second balance ring of the magnetic rotor forming the second axial end and having a second base and a second flange extending axially from the second base past the second axial end of the rotor, the second base being located within the shell, the second flange of the second balance ring extending away from the shell and including a second cylindrical shaped cutout having a second open end extending radially outward from the rotor axis and a second cutout axis aligned to axis of the magnetic rotor;

a stator;

an airgap between the stator and the rotor; and a shaft rotatable about the rotor axis;

wherein the first balance ring and the second balance ring are configured to be an oil flinger to eject oil from the first cutout and the second cutout as the first balance ring and the second balance ring rotate, and the first cutout and the second cutout are configured to have a diameter based on a measured imbalance of the magnetic rotor.

9. The turbocharger of claim 8, wherein:

the first cutout is disposed on an outer circumferential surface of the first balance ring and includes a first cutout wall, the entire first cutout wall being exposed to the first open end; and the second cutout is disposed on an outer circumferential surface of the second balance ring and includes a second cutout wall, the entire second cutout wall being exposed to the second open end.

10. The turbocharger of claim 8, wherein the first cutout is a first cylindrical cutout having a first cutout axis that is transverse to the rotor axis and extends radially outward from the rotor axis, and the second cutout is a second cylindrical cutout having a second cutout axis that is transverse to the rotor axis and extends radially outward from the rotor axis.

11. The turbocharger of claim 8, wherein the first cutout is a first cutout having a first cutout axis that is parallel to the rotor axis and the second cutout is a second cutout having a second cutout axis that is parallel to the rotor axis.

12. The turbocharger of claim 8, wherein a first cutout axis of the first cutout coincides with a second cutout axis of the second cutout.

13. The turbocharger of claim 8, wherein either one or both of the first cutout and the second cutout is a concave cutout.

14. A rotor for a turbocharger comprising:

a magnetic core mounted on a shaft of the turbocharger, the magnetic core having a shell;

a balance ring disposed on a first axial end of the magnetic core and having a base and a flange extending axially from the base away from the first axial end of the magnetic core and extending radially away from the shaft of the turbocharger, the base being contained within the shell; and a cylindrical shaped cutout provided on an outer circumferential surface of the flange of the balance ring, the cutout having an open end extending radially outward from a rotor axis and a cutout axis aligned to an axis of the magnetic core, wherein the balance ring is configured to be an oil flinger to eject oil from the cutout as the balance ring rotates, and the cutout is configured to have a diameter based on a measured imbalance of the magnetic rotor.

15. The rotor of claim 14, wherein a size of the cutout is based on a measure of imbalance of the magnetic core combined with the balance ring.

16. The rotor of claim 14, wherein the flange of the balance ring extends axially past a first end of the shell.

* * * * *